3 Sheets—Sheet 1.

J. P. TIRRELL,

Assignor to G. F. PINKHAM.

APPARATUS FOR LIGHTING AND EXTINGUISHING GAS BY ELECTRICITY

No. 9,846. Reissued Aug. 23, 1881.

Witnesses:

Geo. W. Mott

S. D. Sullivan

Inventor:

Jacob P. Tirrell

By his Attorney

C. G. D. Le Sourd

3 Sheets—Sheet 2.

J. P. TIRRELL,

Assignor to G. F. PINKHAM.

APPARATUS FOR LIGHTING AND EXTINGUISHING GAS BY ELECTRICITY.

No. 9,846. Reissued Aug. 23, 1881.

Witnesses:

Geo. H. Mott

S. D. Sullivan

Inventor:

Jacob P. Tirrell

By his attorney

E. N. Dickerson Jr.

J. P. TIRRELL,

Assignor to G. F. PINKHAM.

APPARATUS FOR LIGHTING AND EXTINGUISHING GAS BY ELECTRICITY.

No. 9,846. Reissued Aug. 23, 1881.

Witnesses:

Geo. H. Miall,

S. D. Sullivan

Inventor:

Jacob P. Tirrell,

By his attorney

E. N. Dickerson

UNITED STATES PATENT OFFICE.

JACOB P. TIRRELL, OF CHARLESTOWN, ASSIGNOR TO GEORGE F. PINKHAM, OF QUINCY, MASSACHUSETTS.

APPARATUS FOR LIGHTING AND EXTINGUISHING GAS BY ELECTRICITY.

SPECIFICATION forming part of Reissued Letters Patent No. 9,846, dated August 23, 1881.

Original No. 121,301, dated November 28, 1871. Application for reissue filed October 19, 1880.

*To all whom it may concern:*

Be it known that I, JACOB P. TIRRELL, of Charlestown, in the county of Middlesex and State of Massachusetts, have invented certain new and useful Improvements in Apparatus for Lighting and Extinguishing Gas by Electricity, of which the following is a full, true, and exact description, reference being had to the accompanying drawings, making part of this specification, in which—

Figure 1:
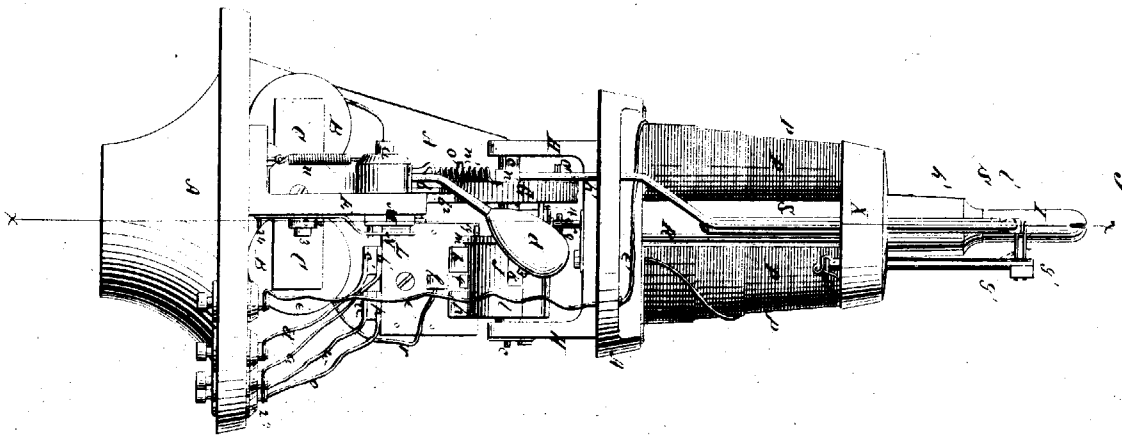
Figure 2:
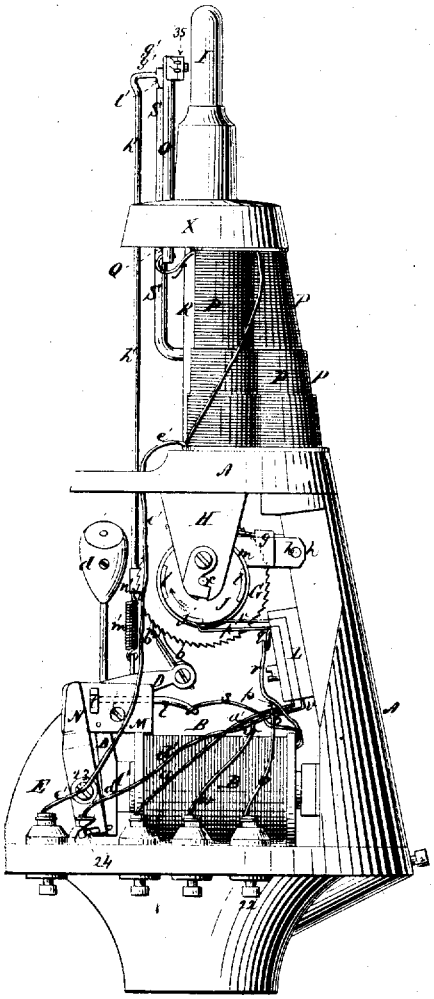
Figure 3:
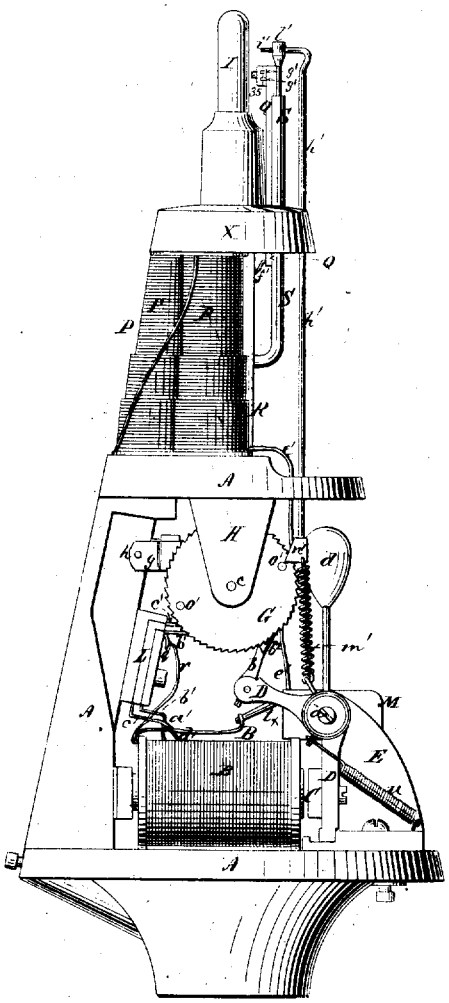
Figure 1:
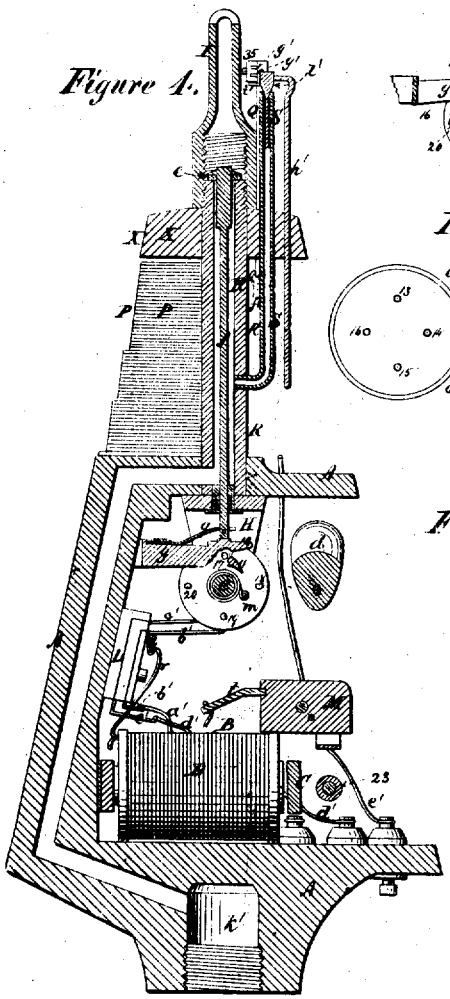
Figure 5:
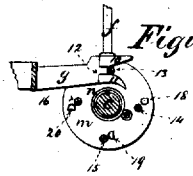
Figure 6:
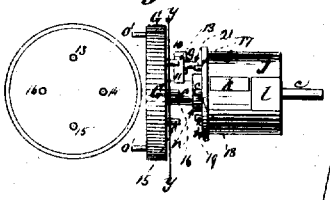
Figure 7:
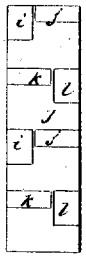
Figure 8:
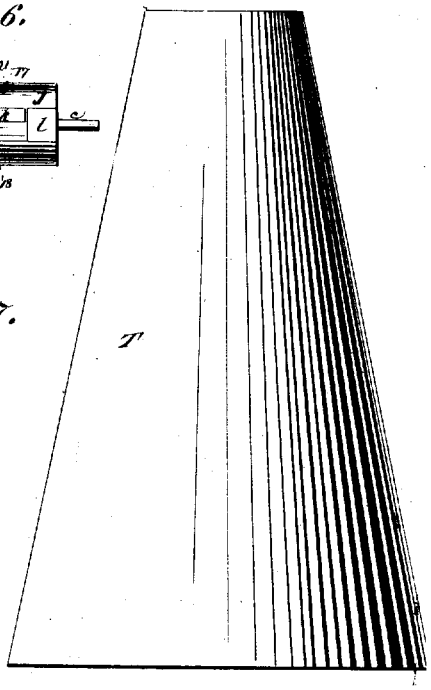
Figure 9:
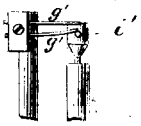

Figure 1 is a front elevation of my improved apparatus. Fig. 2 is an elevation of one side of the same. Fig. 3 is an elevation of the opposite side. Fig. 4 is a vertical section on the line *x x* of Fig. 1. Fig. 5 is a vertical section on the line *y y* of Fig. 6. Fig. 6 is an elevation of a cylinder and parts connected therewith, to be hereinafter described. Fig. 7 represents the surface of the cylinder developed. Fig. 8 represents the cover or casing which incloses the apparatus. Fig. 9 represents a detail of the spring wiping electrode.

My invention relates to that class of apparatus in which two separate wires are employed alternately, one for letting on and the other for shutting off the gas; and it consists in the peculiar construction of the mechanism by which the gas is let on and shut off and the electric current caused to pass to the next apparatus, one apparatus only at a time being included in the electric circuit; and my invention also consists in the application to an electrical apparatus for lighting and extinguishing gas of a circuit-breaker operated by the armature of the electro-magnet and placed in close proximity thereto, whereby the armature is set in motion by the electric current without the employment of a key or clock-work mechanism at the central station; and my invention also consists in the combination of an auxiliary burner with the main burner and an electric-spark-generating mechanism, by which construction I am enabled to permanently place the spark-generating mechanism out of the reach of the flame issuing from the main burner; and my invention furthermore consists in arranging the primary coils for producing the sparks within the apparatus in close proximity to the burner, which facilitates the construction of the apparatus and lessens its cost.

To enable others skilled in the art to understand and use my invention, I will proceed to describe the manner in which I have carried it out.

In the said drawings, A represents the frame-work of the apparatus, to the lower portion of which is secured the electro-magnet B, the armature C of which is secured to the end of a bent lever, D, which is pivoted at *a* to a standard, E, and has pivoted to its upper end a pawl, *b*, which engages with the teeth of a ratchet-wheel, G, the shaft *c* of which revolves in bearings in a bifurcated support, H, secured to the upper portion of the frame-work. The ratchet-wheel G, after being moved by the pawl *b*, is held by a retaining pawl or spring, $b^2$.

*d* is a counterpoise-weight attached to a rod projecting up from the lever D.

*e* is the valve through which the gas is admitted to the burner I, the lower end of the stem *f* of this valve being connected by means of a spring, 9, with a lever, *g*, which is pivoted to the frame-work at *h*, and is provided at its outer end with inclined jaws 10 11 and a groove, 12, Fig. 5. This lever is alternately raised and lowered to open and close the valve *e* by a series of pins, 13 14 15 16, which project from one side of the ratchet-wheel G and act alternately on the inclined sides of the jaws, the pins 13 15, which come in contact with the upper jaw, 10, being farther from the center of the wheel than the pins 14 16, which act on the lower jaw, 11, while each pin passes through the groove 12 in the lever as the wheel G revolves. The spring-connection 9 is for the purpose of insuring the tight closing of the valve *e* as the lever *g* is carried down.

J is a cylinder, of hard rubber or other non-conducting material, which is supported upon the shaft *c* and turns independently thereof. This cylinder has let into its surface, so as to lie flush therewith, four pairs of metallic plates, *i j*, *k l*, *i j*, *k l*, each pair extending lengthwise across the cylinder, while the distance between the line passing through the center of the narrow plate of one pair and that passing through the center of the narrow plate of the next pair is equal to one-fourth of the circumference of the cylinder. The two plates of a pair are separated a short distance from each other, as seen in Figs. 1, 6, and 7, so as to be perfectly insulated. To one end of the cylinder J is secured a circular plate, *m*, to a pin projecting from which is secured one end of a flat coiled spring, *n*, the other end of which is attached to the shaft *c*.

17 18 19 20 are four pins projecting from the plate *m*, the pins 17 19 being nearer the center than the pins 18 20, so that one of these four pins will always be in contact with a stop-pin, 21, Fig. 6, projecting from the lever *g*, when the latter is raised or depressed to its full extent. The cylinder is thus held stationary while the ratchet-wheel is being turned, and the shaft *c* as it revolves thus winds up the spring *n* until the movement of the lever carries the stop 21 away from the pin resting against it, when the cylinder is instantly revolved a quarter-way round by the recoil of the spring *n*, the movement of the cylinder being stopped by the next pin coming in contact with the stop 21 on the lever *g*. The cylinder is thus carried around one-quarter of a revolution each time the lever *g* is raised or depressed, for a purpose that will be described hereinafter.

I will now proceed to describe the manner in which the electric current is caused to pass through the apparatus for the purpose of rotating the ratchet-wheel G to let on and shut off the gas at the required times.

The parts being in the position seen in Fig. 1, (the gas being shut off,) the electric current enters the apparatus at 22 and passes by the wire *o* to a flat spring, *p*, the rear portion of which is embedded in the insulating-block L. The upper portion of the spring *p* bears against one of the narrow metal plates *j* of the cylinder J, and against this *j* also bears another narrow spring, *q*, a part of which is also embedded in the block L. The current now passes by the spring *q* to a wire, *r*, connected with the electro-magnet B, after passing through which the current is conducted by a wire, *s*, to a metallic piece, *t*, set in an insulating-block, M; thence to the upper end of a lever, N, with which it is in contact; thence to the frame-work, and by the gas-pipe or ground back to the battery, when the circuit is completed, and the armature C is attracted by the magnet. The lever N is pivoted at 23 to the frame-work, and at its lower end is a notch, into which fits a bent wire, 24, projecting from the lever D, and thus as the armature is drawn up against the magnet the lever N is vibrated, which throws its upper end out of contact with the piece *t* and breaks the electric circuit. As soon as this takes place the armature ceases to be attracted, and is drawn back by its spring *u* into the position seen in Fig. 3, when the circuit is again completed and the operation is repeated as before. The armature C is thus set in motion by the electric current without the employment of a key or clock-work mechanism at the central station, as has heretofore been required. This motion of the armature C and its lever D vibrates the pawl *b*, which thus turns the ratchet-wheel G, the motion of which is instantly arrested, as soon as it has completed a quarter of a revolution, (which opens the gas-valve *e* to its full extent,) by the movement of the cylinder J, which is that instant released and revolved a quarter-turn, as above described. This quarter-revolution of the cylinder J carries the narrow plate *j* out of contact with the spring *p*, and brings the wide plate *l* of the next pair into contact therewith, the narrow spring *q* being at the same time brought into contact with the other plate, *k*, of the same pair. The current cannot now pass from the spring *p* to the spring *q*, as the plates *k l* are insulated from each other, and the circuit through the electro-magnet is thus broken and the motion of the ratchet-wheel G arrested. The current then passes from the spring *p* through the wide plate *l* to another spring, *v*, which is also embedded in the block L, and thence by the wire *w* to the next apparatus, where the same operation is repeated, and so on throughout the whole series of lamps, one apparatus only being included within the circuit at a time, the electric current passing from one to another in succession until it has passed through the entire series, the gas-valve *e* of each apparatus being left in the exact position required when the motion of the wheel G is arrested by the automatic breaking of the circuit caused by the movement of the cylinder J. As soon as the gas is let on it is ignited by the electric sparks, in a manner which will be fully described hereinafter. The armature C cannot again be set in motion (when it is desired to shut off the gas) by a current passing through the wire *o*, on account of the circuit having been broken, as above described. Another wire, *a'*, is therefore employed, through which the electric current passes to a flat spring, *b'*, the rear portion of which is embedded in the insulating-block L. The upper portion of this spring *b'* bears against one of the narrow metal plates *k* of the cylinder J, and as the spring *q* is also at this time in contact with the plate *k*, the current passes by the wire *r* to the electro-magnet B and back to the battery, as before. This again sets the armature C in motion and rotates the wheel G for the purpose of closing the valve *e* and extinguishing the gas. As soon as the wheel G has completed a quarter-revolution (which completely closes the valve *e*) the cylinder J is released and revolved a quarter-revolution, which carries the plate *k* out of contact with the spring *b'*, and brings the wide plate *i* of the next pair into contact therewith, the spring *q* being at the same time brought into contact with the other plate, *j*. The current cannot now pass from the spring *b'* to the spring *q*, as the plates *i j* are insulated from each other, and the circuit through the magnet is thus broken and the motion of the ratchet-wheel arrested. The current then passes from the spring *b'*, through the wide plate *i*, to another spring, *c'*, which is also embedded in the block L, and thence by the wire *d'* to the next apparatus, where the same operation is repeated, the current passing successively from one apparatus to another until all of the lamps are extinguished. The narrow plate *j* is thus left in contact with both of the springs *p q*, so that the armature C may be again set in motion to open the valve *e* by the current passing through the wire *o*, as before described.

It will thus be seen that the arrangement of the plates on the cylinder J is such that as the latter is operated the breaking of the circuit through the wire *o* and electro-magnet B will not only cause the current to pass onto the next apparatus, but will leave the electro-magnet B connected with the other wire, *a'*, through which a current may be transmitted at the required time, while the breaking of the circuit through the wire *a'* and electro-magnet B will cause the current to pass onto the next apparatus, and at the same time leave the electro-magnet connected with the wire *o*, the wires *o a'* being thus used alternately, one to carry the current for opening the gas-valve and the other the current for closing it, the electro-magnet being at all times connected with one or the other of the wires *o a'*. The electric current which produces the sparks for lighting the gas passes from one pole of the battery by the wire *e'* to the primary coils P, which are placed near the top of the apparatus. I place the primary coils P for producing the sparks in close proximity to the burner, as it facilitates the construction of the apparatus, and renders it less expensive than where these coils are placed beneath the lamp-post, as heretofore. After passing through the coils P, the current passes by the wire *f'* to the insulated rod or post Q, to the upper end of which are secured two light springs, *g' g'*. These springs and their action are shown clearly in Fig. 9.

It will be seen that the movement of the pin *i* past the spring-electrode *g'* causes a wiping contact or friction between said pin and the spring-electrode. The advantages of this are twofold: By having the contact between the movable and the fixed electrode a spring-contact, a friction is made which wipes or cleans the parts moving past each other, thereby constantly maintaining a bright surface.

One of the difficulties of obtaining a bright spark at the point of combustion is that the points of contact of the electrodes become coated with carbon, and consequently insulated or partly insulated from each other. This wiping spring movement avoids this difficulty. In the second place, a longer contact between the spring and the pin is obtained than if it were simply a blow or instantaneous contact, as it is found by experience that a better spark is obtained if the battery-current is allowed to flow for an instant before separation of the electrodes.

The spring is duplicated, so as to insure certainty of lighting if the first spring should not act properly; but the first spring is all that is necessary, as a rule, to insure ignition.

The other pole of the battery is connected through the frame-work A with a sliding rod, *h'*, near the upper end of which is a pin, *i'*, which is raised and lowered in a manner to be presently described, and thus when the contact between the pin *i'* and springs *g' g'* is made and broken as the rod *h'* is raised the sparks are produced as required. The springs *g' g'* are held in place by a small plate, 35, secured to the post Q by a screw, so that they can be adjusted or replaced at small cost when worn or burned out. The gas is admitted to the apparatus at *k'* and passes up through a passage formed in the frame-work A to the pipe R, to which the burner I is attached. The pipe R is surrounded near its upper end by an insulating-disk, X. Connected with the pipe R below the valve *e* is an auxiliary burner, S, the small orifice at the top of which is closed by a valve, *l'*, attached to the upper end of the rod *h'*, and this valve is kept closed down upon its seat by a spring, *m'*, attached to the lever D, and a block, *n'*, at the lower end of the rod *h'*.

*o' o'* are two pins projecting from the side of the ratchet-wheel G, which are brought into contact with the block *n'*, when, as the wheel G revolves, the rod *h'* is raised so as to open the valve *l'* and allow the gas to escape from the auxiliary burner, which is instantly lighted by the sparks produced by the contact between the pin *i'* and springs *g' g'*, being made and broken as the rod *h'* is raised. The orifice through which the gas escapes from the auxiliary burner is on one side only of the valve *l'*, viz., on the side to which the pin *i'* is attached, so that the gas as it escapes will flow directly up to the point where the sparks are produced, which renders it more certain to be lighted. As soon as the auxiliary burner is lighted the valve *e* commences to open, and the gas issuing from the main burner I is instantly ignited from the flame of the auxiliary burner. The pin *o'* now passes out of contact with the block *n'*, when the rod *h'* is drawn down by the spring *m'*, closing the valve *l'* and extinguishing the auxiliary jet.

By the employment of an auxiliary burner I am enabled to permanently place that portion of the apparatus where the sparks are produced out of the reach of the flame issuing from the burner I, and thus avoid the necessity of employing mechanism to raise the whole spark-producing apparatus up to the orifice of the main burner, and then lower it, as has heretofore been necessary to prevent it from being injured or destroyed by the flame. Another advantage resulting from the use of an auxiliary burner is that the small jet of gas issuing from it is more readily ignited by the electric spark than a large jet. Consequently it is more certain to be lighted.

It will be seen that with the above-described apparatus a quarter of a revolution only of the wheel G is required to open or close the gas-valve *e*, instead of a half-revolution, as heretofore, and a saving of time is thereby effected, while the action of the apparatus is certain and reliable.

The apparatus is surrounded by a conical sheet-metal cover or casing, T, Fig. 8, which serves to exclude dust and moisture.

What I claim as my invention, and desire to secure by Letters Patent, is—

1. The within-described mechanism for automatically breaking the circuit through the electro-magnet and causing the current to pass to the next apparatus, the said mechanism consisting, essentially, of the ratchet-wheel G, operated by the electro-magnet, in combination with the shaft *c*, lever *g*, cylinder J, with its insulated plates, and the springs *p q v b′ c′* and wires connected therewith, operating substantially as set forth.

2. The ratchet-wheel G, with its pins 13 14 15 16, in combination with the lever *g*, for operating the gas-valve *e*, substantially as described.

3. The combination of an auxiliary burner, S, with the main burner I and an electric-spark-generating mechanism, substantially as and for the purpose described.

4. One or more springs, *g′ g′*, attached to the insulated post Q, and connected with one pole of the battery, in combination with the pin *i′*, connected with the opposite pole of the battery for producing the sparks, substantially as described.

5. The rod *h′*, in combination with the valve *l′*, auxiliary burner S, pin *i′*, and one or more springs, *g′ g′*, operating substantially as described.

6. The device for producing the electric spark, consisting of a stationary electrode electrically connected, having a flexible wiping contact-point, substantially as described, in combination with a movable reciprocating electrode, a stop-carrying spindle for moving the electrode in one direction, and a retractile spring for moving it in the other direction, and the armature of an electro-magnet for rotating said spindle, whereby the time of contact between the electrodes is lengthened and the points of contact kept bright and clean.

7. In an electrical gas-lighting apparatus, the combination, with a fixed wiping-spring electrode, of a reciprocating electrode, a spindle carrying a stop for moving said electrode in one direction, a spring for moving it in the other direction, the armature of an electro-magnet for rotating said spindle, and a valve for controlling the gas-supply operated by the same spindle that actuates the reciprocating electrode, all operating substantially as described.

8. In an electric gas-lighting apparatus, the combination of the sliding rod *h′*, provided with a contact-point, *i′*, a spindle carrying a stop for moving said point or electrode in one direction, a rectractile spring for moving it in the other direction, an electro-magnet for rotating said spindle, and a fixed wiping-spring electrode.

9. The sliding rod *h′*, with its contact-point *i′*, in combination with the spindle *c*, rotated by the armature of an electro-magnet, and provided with means, substantially as described, for raising said rod *h′*, and a fixed wiping-spring electrode, having suitable electrical connections for breaking and closing the circuit, the whole constructed and arranged for the purposes set forth.

JACOB P. TIRRELL.

Witnesses:
P. E. TESCHEMACHER,
CHAS. E. GRIFFIN.